US008911289B2

(12) United States Patent
Takeda et al.

(10) Patent No.: US 8,911,289 B2
(45) Date of Patent: Dec. 16, 2014

(54) GAMING MACHINE COMPRISING INDICATING DEVICE SHOWING TERRITORY DETERMINED BY GAMING RESULT

(75) Inventors: Mitsuhiro Takeda, Tokyo (JP); Takeshi Aoki, Tokyo (JP); Tomoyuki Hasegawa, Tokyo (JP); Shintarou Okazawa, Tokyo (JP); Tsuyoshi Ohira, Tokyo (JP); Takanori Sakata, Tokyo (JP); Hiroki Abe, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 718 days.

(21) Appl. No.: 12/575,898

(22) Filed: Oct. 8, 2009

(65) Prior Publication Data

US 2010/0087244 A1 Apr. 8, 2010

Related U.S. Application Data

(60) Provisional application No. 61/103,773, filed on Oct. 8, 2008.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.
CPC ............ *G07F 17/34* (2013.01); *G07F 17/3202* (2013.01); *G07F 17/3216* (2013.01)
USPC ............................................................ 463/20

(58) Field of Classification Search
CPC .. G07F 17/34; G07F 17/3202; G07F 17/3216
USPC ............................................................ 463/20
See application file for complete search history.

(56) References Cited

U.S. PATENT DOCUMENTS

| | | | | |
|---|---|---|---|---|
| 2002/0042295 | A1* | 4/2002 | Walker et al. | 463/20 |
| 2004/0204227 | A1* | 10/2004 | Johnson | 463/20 |
| 2006/0003829 | A1* | 1/2006 | Thomas | 463/20 |
| 2007/0004506 | A1* | 1/2007 | Kinsley et al. | 463/29 |
| 2007/0238510 | A1* | 10/2007 | Halprin | 463/20 |
| 2008/0045306 | A1 | 2/2008 | Okada | |
| 2008/0076513 | A1* | 3/2008 | Esses et al. | 463/20 |
| 2008/0176633 | A1* | 7/2008 | Sakuma | 463/20 |
| 2010/0004047 | A1* | 1/2010 | Acres | 463/20 |
| 2010/0056248 | A1* | 3/2010 | Acres | 463/20 |

* cited by examiner

*Primary Examiner* — Melba Bumgarner
*Assistant Examiner* — Sylvia Weatherford
(74) *Attorney, Agent, or Firm* — Lexyoume IP Meister, PLLC

(57) ABSTRACT

While one video reel is being scrolled and the remaining video reels stop scrolling, a map of Japan or a map of America is displayed on a liquid crystal panel. A territory corresponding to a player is distinguished by color on the map. There is a correlation in terms of probability between the territory corresponding to the player distinguished by color and a payout amount corresponding to a symbol combination to be realized upon stop of scroll of all the video reels.

1 Claim, 18 Drawing Sheets

FIG. 3

| SYMBOL NUMBER | VIDEO REEL R1 | VIDEO REEL R2 | VIDEO REEL R3 |
|---|---|---|---|
| 21 | FRANKENSTEIN | FRANKENSTEIN | FRANKENSTEIN |
| 20 | PLUM | BELL | CHERRY |
| 19 | ORANGE | APPLE | ORANGE |
| 18 | PLUM | BELL | APPLE |
| 17 | ORANGE | CHERRY | ORANGE |
| 16 | PLUM | ORANGE | PLUM |
| 15 | ORANGE | PLUM | ORANGE |
| 14 | PLUM | CHERRY | PLUM |
| 13 | BLUE 7 | BELL | ORANGE |
| 12 | CHERRY | APPLE | PLUM |
| 11 | ORANGE | BELL | ORANGE |
| 10 | BELL | STRAWBERRY | PLUM |
| 09 | ORANGE | PLUM | BELL |
| 08 | STRAWBERRY | BLUE 7 | STRAWBERRY |
| 07 | BLUE 7 | BELL | BLUE 7 |
| 06 | ORANGE | APPLE | BELL |
| 05 | APPLE | BELL | CHERRY |
| 04 | PLUM | STRAWBERRY | PLUM |
| 03 | ORANGE | PLUM | ORANGE |
| 02 | PLUM | CHERRY | PLUM |
| 01 | BLUE 7 | BELL | ORANGE |
| 00 | CHERRY | APPLE | PLUM |

FIG. 6

| WINNING COMBINATION | | | PAYOUT AMOUNT |
|---|---|---|---|
| FRANKENSTEIN | FRANKENSTEIN | FRANKENSTEIN | 100+FREE GAME |
| BLUE 7 | BLUE 7 | BLUE 7 | 10 |
| BELL | BELL | BELL | 8 |
| APPLE | APPLE | APPLE | 7 |
| CHERRY | CHERRY | CHERRY | 5 |
| STRAWBERRY | STRAWBERRY | STRAWBERRY | 5 |
| PLUM | PLUM | PLUM | 4 |
| ORANGE | ORANGE | ORANGE | 3 |
| CHERRY | CHERRY | (ANY) | 2 |
| ORANGE | ORANGE | (ANY) | 2 |
| CHERRY | (ANY) | (ANY) | 1 |
| ORANGE | (ANY) | (ANY) | 1 |

FIG. 13
| TERRITORY | IMAGE DATA |
|---|---|
| 1 | 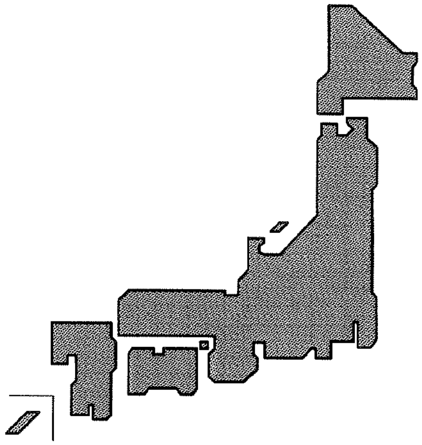 |
| 2 | 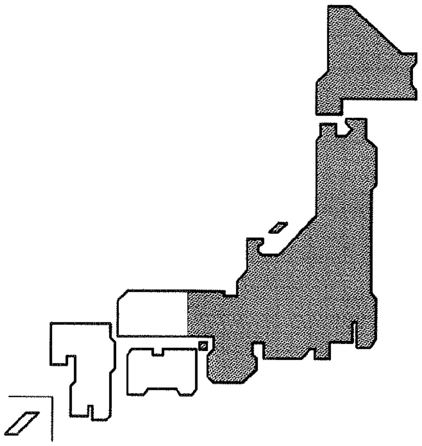 |
| 3 | 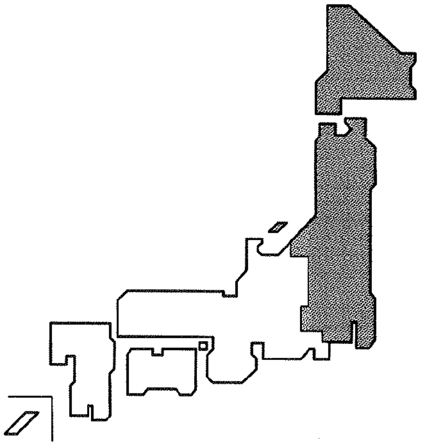 |

FIG. 14

| FRANKENSTEIN – FRANKENSTEIN – FRANKENSTEIN | |
|---|---|
| RANDOM NUMBER VALUE | TERRITORY |
| 0 ~ 149 | 1 |
| 150 ~ 229 | 2 |
| 230 ~ 255 | 3 |

FIG. 15

| BLUE 7 – BLUE 7 – BLUE 7 | |
|---|---|
| RANDOM NUMBER VALUE | TERRITORY |
| 0 ~ 99 | 1 |
| 100 ~ 199 | 2 |
| 200 ~ 255 | 3 |

FIG. 16

| BELL – BELL – BELL | |
|---|---|
| RANDOM NUMBER VALUE | TERRITORY |
| 0 ~ 89 | 1 |
| 90 ~ 195 | 2 |
| 196 ~ 255 | 3 |

FIG. 17

| APPLE - APPLE - APPLE | |
|---|---|
| RANDOM NUMBER VALUE | TERRITORY |
| 0 ~ 79 | 1 |
| 80 ~ 189 | 2 |
| 190 ~ 255 | 3 |

FIG. 18

| CHERRY - CHERRY - CHERRY | |
|---|---|
| RANDOM NUMBER VALUE | TERRITORY |
| 0 ~ 69 | 1 |
| 70 ~ 185 | 2 |
| 186 ~ 255 | 3 |

FIG. 19

| STRAWBERRY - STRAWBERRY - STRAWBERRY | |
|---|---|
| RANDOM NUMBER VALUE | TERRITORY |
| 0 ~ 69 | 1 |
| 70 ~ 185 | 2 |
| 186 ~ 255 | 3 |

FIG. 20

| PLUM – PLUM – PLUM | |
|---|---|
| RANDOM NUMBER VALUE | TERRITORY |
| 0 ~ 59 | 1 |
| 60 ~ 179 | 2 |
| 180 ~ 255 | 3 |

FIG. 21

| ORANGE – ORANGE – ORANGE | |
|---|---|
| RANDOM NUMBER VALUE | TERRITORY |
| 0 ~ 49 | 1 |
| 50 ~ 175 | 2 |
| 176 ~ 255 | 3 |

FIG. 22

| CHERRY – CHERRY – (ANY) | |
|---|---|
| RANDOM NUMBER VALUE | TERRITORY |
| 0 ~ 19 | 1 |
| 20 ~ 99 | 2 |
| 100 ~ 255 | 3 |

FIG. 23

| ORANGE – ORANGE – (ANY) | |
|---|---|
| RANDOM NUMBER VALUE | TERRITORY |
| 0 ~ 19 | 1 |
| 20 ~ 99 | 2 |
| 100 ~ 255 | 3 |

FIG. 24

| CHERRY – (ANY) – (ANY) | |
|---|---|
| RANDOM NUMBER VALUE | TERRITORY |
| 0 ~ 9 | 1 |
| 10 ~ 95 | 2 |
| 96 ~ 255 | 3 |

FIG. 25

| ORANGE – (ANY) – (ANY) | |
|---|---|
| RANDOM NUMBER VALUE | TERRITORY |
| 0 ~ 9 | 1 |
| 10 ~ 95 | 2 |
| 96 ~ 255 | 3 |

| SWITCH | COUNTRY NAME |
|---|---|
| 1 | JAPAN |
| 2 | AMERICA |

FIG. 30
| TERRITORY | IMAGE DATA |
| --- | --- |
| 1 | 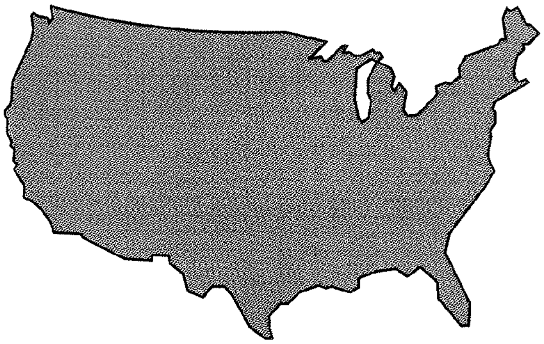 |
| 2 | 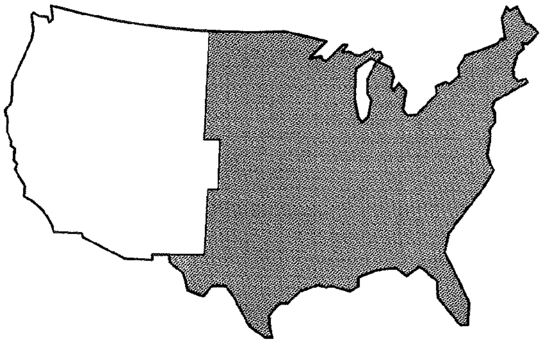 |
| 3 | 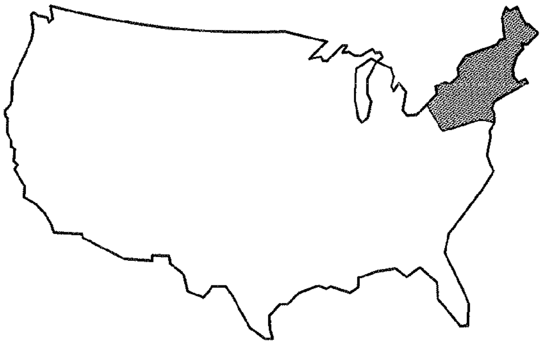 |

GAMING MACHINE COMPRISING INDICATING DEVICE SHOWING TERRITORY DETERMINED BY GAMING RESULT

CROSS-REFERENCE TO RELATED APPLICATIONS

This application is based upon and claims a priority from the U.S. Provisional Patent Application No. 61/103,773 filed on Oct. 8, 2008, the entire contents of which are incorporated herein by reference.

BACKGROUND

1. Field

The present disclosure relates to a gaming machine which notifies a player of a magnitude of a gaming value corresponding to a game result.

2. Description of Related Art

Conventional gaming machines include a slot machine, which conducts a game in which symbols are rearranged in response to a rotation and a stop of reels.

In such a game, when any winning combination is realized by the rearranged symbols (game result), at least a gaming value corresponding to the winning combination (game result) is awarded to a player. At this time, as described in US Patent Laid-Open No. 2008/0045306, the gaming value to be awarded to the player may be notified. In a notification manner described in US Patent Laid-Open No. 2008/0045306, concrete numerals related to a magnitude of a gaming value are shown to a player, so the contents of the notification are easy-to-understand for the player.

However, if a magnitude of a gaming value corresponding to a game result is notified by an indirect effect of light, sound or image instead of concrete numerals or letters, a player may not be able to understand such effect as notification. Further, when the contents of the effect are changed in accordance with a magnitude of a gaming value corresponding to a game result, a player has a strong tendency to be unable to understand such effect as notification. This is the same if a hitting ratio is set in notification in accordance with a magnitude of a gaming value corresponding to a game result.

SUMMARY

Then, the present disclosure was made in view of the aforementioned respects, and an object thereof is to provide a gaming machine in which an indirect effect for notifying a player of a magnitude of a gaming value corresponding to a game result is conducted in such a manner that the player can easily understand the effect even when a hitting ratio is set in the notification in accordance with a magnitude of a gaming value corresponding to a game result.

To achieve the object of the present disclosure, there is provided a gaming machine, comprising: a symbol arranging device in which a plurality of symbols are arranged; a territory displaying device in which any one of a plurality of territories that differ from each other in size is displayed; a memory device which stores a probability table which manages probabilities by respectively-associating the plurality of territories with the probabilities that balance in a high degree between a size of one of the plurality of the territories and a magnitude of a gaming value which is awarded based on the arranged symbols to a player; and a processor which controls respective operations of the symbol arranging device, the territory displaying device and the memory device and which is being programmed so as to conduct each processing from the processing of (1) below to the processing of (4) below, (1) determining a plurality of symbols to be rearranged on the symbol arranging device; (2) determining, based on the plurality of symbols determined at the processing of (1) above, whether or not to award a gaming value to a player; (3) if determined to award the gaming value to the player at the processing of (2) above, selecting, based on a magnitude of the gaming value to be awarded and the probability of the probability table, any one of the plurality of territories; and (4) displaying the selected territory on the territory displaying device.

Furthermore, according to another aspect, there is provided a gaming machine comprising: a processor; a symbol arranging device controlled by the processor; a game start button which triggers the processor to execute a control of arranging a plurality of symbols on the symbol arranging device; a display controlled by the processor; and a memory device which stores a probability table that the processor uses for selecting through a random number an image to be displayed on the display from among a plurality of images that show a territory corresponding to a player, wherein the probability table is: (1) provided for each of plurality of game results that the processor randomly determines based on a state of arrangement of the plurality of symbols arranged on the symbol arranging device; (2) configured in such a manner that an image which shows a large territory corresponding to a player is selected by the processor with a high probability, in a case that a gaming value to be awarded based on the determined game result to a player is large; and (3) configured in such a manner that an image which shows a small territory corresponding to a player is selected by the processor with a high probability, in a case that a gaming value to be awarded based on the determined game result to a player is small.

BRIEF DESCRIPTION OF THE DRAWINGS

FIG. 3 is a schematic view schematically-showing symbol columns drawn on a reel band of each video reel which is provided in the gaming machine;

FIG. 6 is a payout table showing winning combinations and payout amounts thereof when a slot game is conducted by using each video reel;

FIG. 13 is a view showing a table which defines a correlation between a territory parameter and an image which is showing the size of a territory corresponding to a player on a map of Japan;

FIG. 14 is a view showing a probability table which defines a correlation between a payout amount corresponding to a combination of three symbols rearranged on a pay line on a screen of the liquid crystal panel which is provided in the gaming machine and a territory corresponding to a player;

FIG. 15 is a view showing a probability table which defines a correlation between a payout amount corresponding to a combination of three symbols rearranged on the pay line on the screen of the liquid crystal panel which is provided in the gaming machine and a territory corresponding to a player;

FIG. 16 is a view showing a probability table which defines a correlation between a payout amount corresponding to a combination of three symbols rearranged on the pay line on the screen of the liquid crystal panel which is provided in the gaming machine and a territory corresponding to a player;

FIG. 17 is a view showing a probability table which defines a correlation between a payout amount corresponding to a combination of three symbols rearranged on the pay line on the screen of the liquid crystal panel which is provided in the gaming machine and a territory corresponding to a player;

FIG. 18 is a view showing a probability table which defines a correlation between a payout amount corresponding to a combination of three symbols rearranged on the pay line on the screen of the liquid crystal panel which is provided in the gaming machine and a territory corresponding to a player;

FIG. 19 is a view showing a probability table which defines a correlation between a payout amount corresponding to a combination of three symbols rearranged on the pay line on the screen of the liquid crystal panel which is provided in the gaming machine and a territory corresponding to a player;

FIG. 20 is a view showing a probability table which defines a correlation between a payout amount corresponding to a combination of three symbols rearranged on the pay line on the screen of the liquid crystal panel which is provided in the gaming machine and a territory corresponding to a player;

FIG. 21 is a view showing a probability table which defines a correlation between a payout amount corresponding to a combination of three symbols rearranged on the pay line on the screen of the liquid crystal panel which is provided in the gaming machine and a territory corresponding to a player;

FIG. 22 is a view showing a probability table which defines a correlation between a payout amount corresponding to a combination of three symbols rearranged on the pay line on the screen of the liquid crystal panel which is provided in the gaming machine and a territory corresponding to a player;

FIG. 23 is a view showing a probability table which defines a correlation between a payout amount corresponding to a combination of three symbols rearranged on the pay line on the screen of the liquid crystal panel which is provided in the gaming machine and a territory corresponding to a player;

FIG. 24 is a view showing a probability table which defines a correlation between a payout amount corresponding to a combination of three symbols rearranged on the pay line on the screen of the liquid crystal panel which is provided in the gaming machine and a territory corresponding to a player;

FIG. 25 is a view showing a probability table which defines a correlation between a payout amount corresponding to a combination of three symbols rearranged on the pay line on the screen of the liquid crystal panel which is provided in the gaming machine and a territory corresponding to a player;

FIG. 30 is a view showing a table which defines a correlation between a territory parameter and an image which is showing the size of a territory corresponding to a player on a map of America.

DETAILED DESCRIPTION

[1. Outline of the Present Disclosure]

Figure 1:
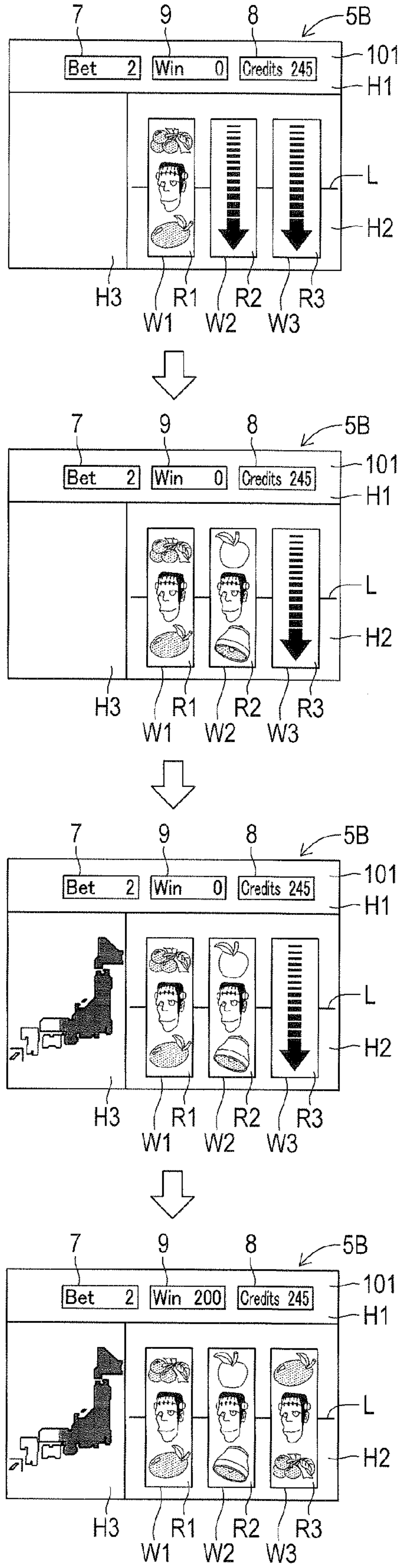
FIG. 1 is a view showing the characteristics of a gaming machine according to the present embodiment.

Hereinafter, one embodiment of the present disclosure will be described with reference to accompanying drawings. FIG. 1 is a view showing the characteristics of a gaming machine according to the present embodiment. Incidentally, when a liquid crystal panel 5B shown in FIG. 1 is specified, the specified liquid crystal panel 5B is described by the number of stages which counted from the uppermost stage in FIG. 1. The liquid crystal panel 5B as shown in FIG. 1 is provided in the gaming machine. A touch panel 101 is provided in a front surface of the liquid crystal panel 5B.

Here, it is assumed that a slot game is conducted in the gaming machine. In the slot game, as shown in FIG. 1, the liquid crystal panel 5B is divided into a screen H1, a screen H2 and a screen H3. On the screen H2 of the liquid crystal panel 5B, symbols drawn on a reel band of each video reel R1, R2 and R3 are displayed on each of display windows W1, W2, and W3 and one pay line L, which horizontally crosses the display windows W1, W2, and W3, is displayed. Further, in the screen H1 of the liquid crystal panel 5B, a bet amount display portion 7, a credit amount display portion 8 and a payout amount display portion 9 are provided.

In the slot game, symbols drawn on the respective reel bands of the video reels R1, R2 and R3 start scrolling in the display windows W1, W2 and W3 on the screen H2 of the liquid crystal panel 5B. Then, the scrolling of the symbols stops. At this time, if three symbols rearranged on the pay line L in the screen H2 of the liquid crystal panel 5B realize a symbol combination corresponding to a winning combination, a player is awarded an amount obtained by multiplying a payout amount corresponding to the realized winning combination with a bet amount. It is to be noted that a payout amount corresponding to a winning combination is defined based on an occurrence degree of the winning combination.

In the slot game, the scrolling of these symbols stops in the following manner. First, as shown in the first, second and third stages of FIG. 1, the symbols drawn on the respective reel bands of the video reels R1, R2 sequentially stop scrolling in the display windows W1 and W2. Then, as shown in the fourth stage of FIG. 1, the symbols drawn on the reel band of the video reel R3 stop scrolling in the display window W3.

At this time, while the symbols drawn on the reel band of the video reel R3 are scrolling in the display window W3, a map of Japan is displayed on the screen H3 of the liquid crystal panel 5B as shown in the second and third stages of FIG. 1. Further, a territory corresponding to the player is distinguished by color on the map of Japan displayed on the screen H3.

The territory which is shown on the map of Japan and which corresponds to the player is correlated with a payout amount corresponding to a combination of three symbols rearranged on the pay line L, in terms of probability. In other words, if a payout amount corresponding to a combination of three symbols rearranged on the pay line L becomes larger, a territory corresponding to a player is more likely to be displayed larger on the map of Japan. In contrast, if a payout amount corresponding to a combination of three symbols rearranged on the pay line L becomes smaller, a territory corresponding to a player is more likely to be displayed smaller on the map of Japan. In this manner, a degree of expectation for a payout amount is shown to a player.

Such a correlation in terms of probability is realized by a probability table provided for each combination of three symbols rearranged on the pay line L (each game result).

Incidentally, it is also possible to display a map of America on the screen H3 instead of the map of Japan, in accordance with the operation by a player before start of a slot game. In this case, a territory corresponding to a player is distinguished by color on the map of America displayed on the screen 113.

[2. Schematic Structure of the Gaming Machine]

Figure 2:
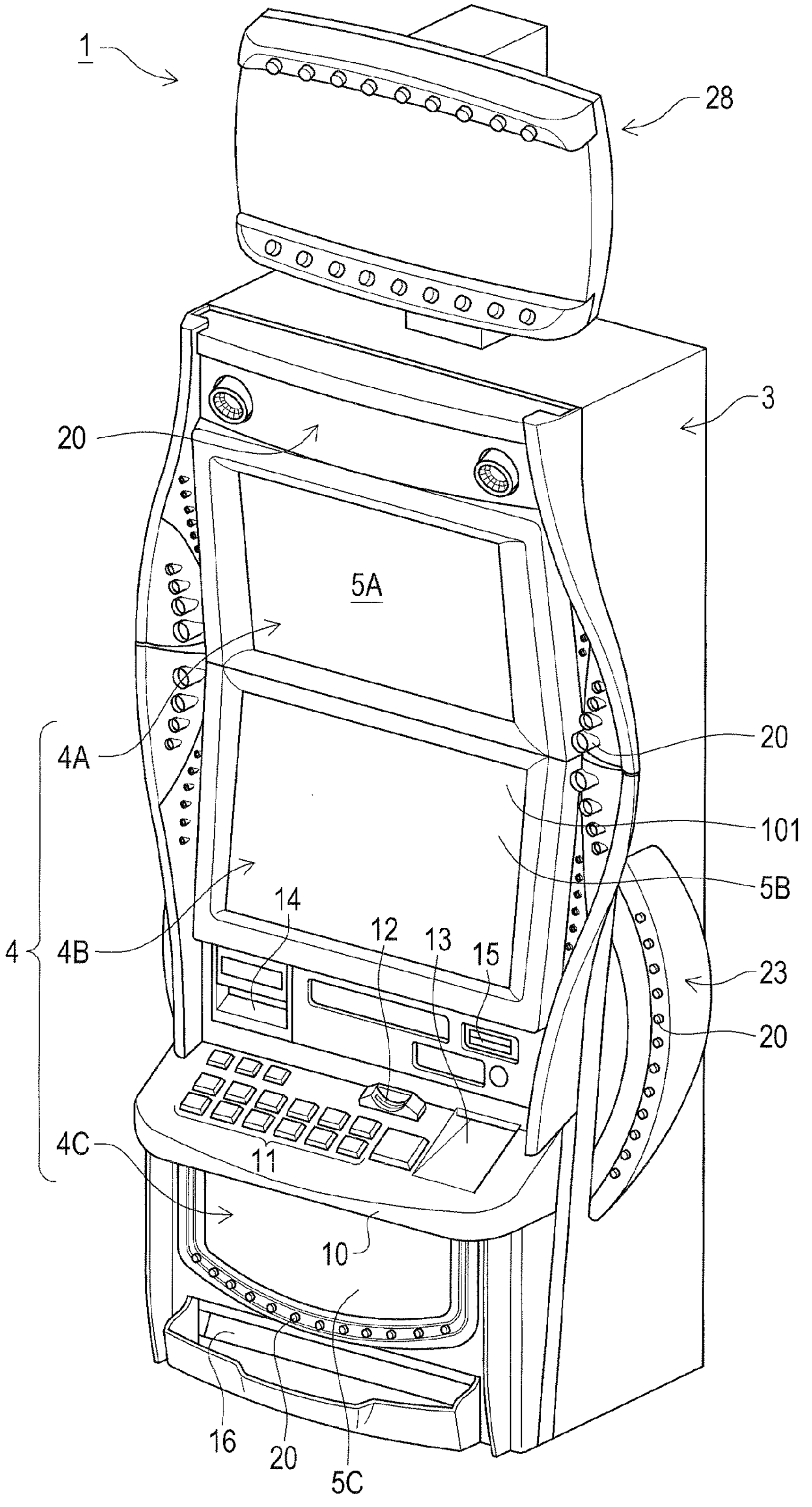
FIG. 2 is an external perspective view of the gaming machine.

Next, a schematic structure of the gaming machine will be described based on FIG. 2. FIG. 2 is an external perspective view of the gaming machine 1.

As shown in FIG. 2, the gaming machine 1 is of an upright type which is equipped with a game arcade such as casino and includes a cabinet 3 for housing electric or mechanical parts for conducting predetermined types of games. A display unit 4 for displaying information related to a game includes, for example, an upper display unit 4A, a variable display unit 4B at the middle stage of the display unit 4, and an under display unit 4C, which are installed at the front face of the cabinet 3 in a vertically long shape. The upper display unit 4A includes a liquid crystal panel 5A arranged at the upper side of the variable display unit 4B, the liquid crystal panel 5A for displaying effecting images, introduction of a game, or explanations of game rules and the like. The under display unit 4C is arranged at the lower side of the variable display unit 4B and includes a plastic panel 5C on which an image is printed. The plastic panel 5C is lighted up with backlighting of the under display unit 4C.

The variable display unit 4B for displaying a state of a game includes the liquid crystal panel 5B which is fixed at a front door of the cabinet 3. The front face of the liquid crystal panel 5B includes the touch panel 101, with which a player can input various commands. The variable display unit 4B at the middle stage of the cabinet 3 is sloped so that the head of the variable display unit 4B tilts back to thereby allow a player to play a game in a comfortable position.

An operation table 10 extending forward is provided in between the variable display unit 4B at the middle stage and the under display unit 4C, on the front face of the cabinet 3. On the operation table 10, there are arranged operation buttons 11 including a BET button, a game start button, a collect button, a CASHOUT button, an indicating-Japan button, an indicating-America button and the like as an operation part for inputting instructions concerning a game conducted. The operation table 10 is provided with a coin insertion slot 12 and a bill insertion slot 13. A ticket printer 14 and a card reader 15 are provided in between the operation table 10 and the variable display unit 4B at the middle stage. The lowermost part of the cabinet 3 is provided with a coin tray 16.

As to the gaming machine 1, coins, bills or electronic value information (credit) corresponding to coins and bills are used as gaming media. However, in the present disclosure, types of gaming media are not restricted to the above. For example, medal, token, electronic money, ticket and the like are applicable as gaming media.

There are also arranged light emitting portions 20 on the cabinet 3 of the gaming machine 1 so as to surround a game area including the upper display unit 4A, the variable display unit 4B at the middle stage, the under display unit 4C and the operation table 10.

The gaming machine 1 is further provided with a topper effect device 28 mounted on the cabinet 3. The topper effect device 28 is of a rectangular board shape and is arranged so as to be substantially parallel with the liquid crystal panel 5A of the upper display unit 4A. The cabinet 3 is further provided with speakers 23 on its both sides.

[3. Internal Configuration of the Gaming Machine]

Figure 4:
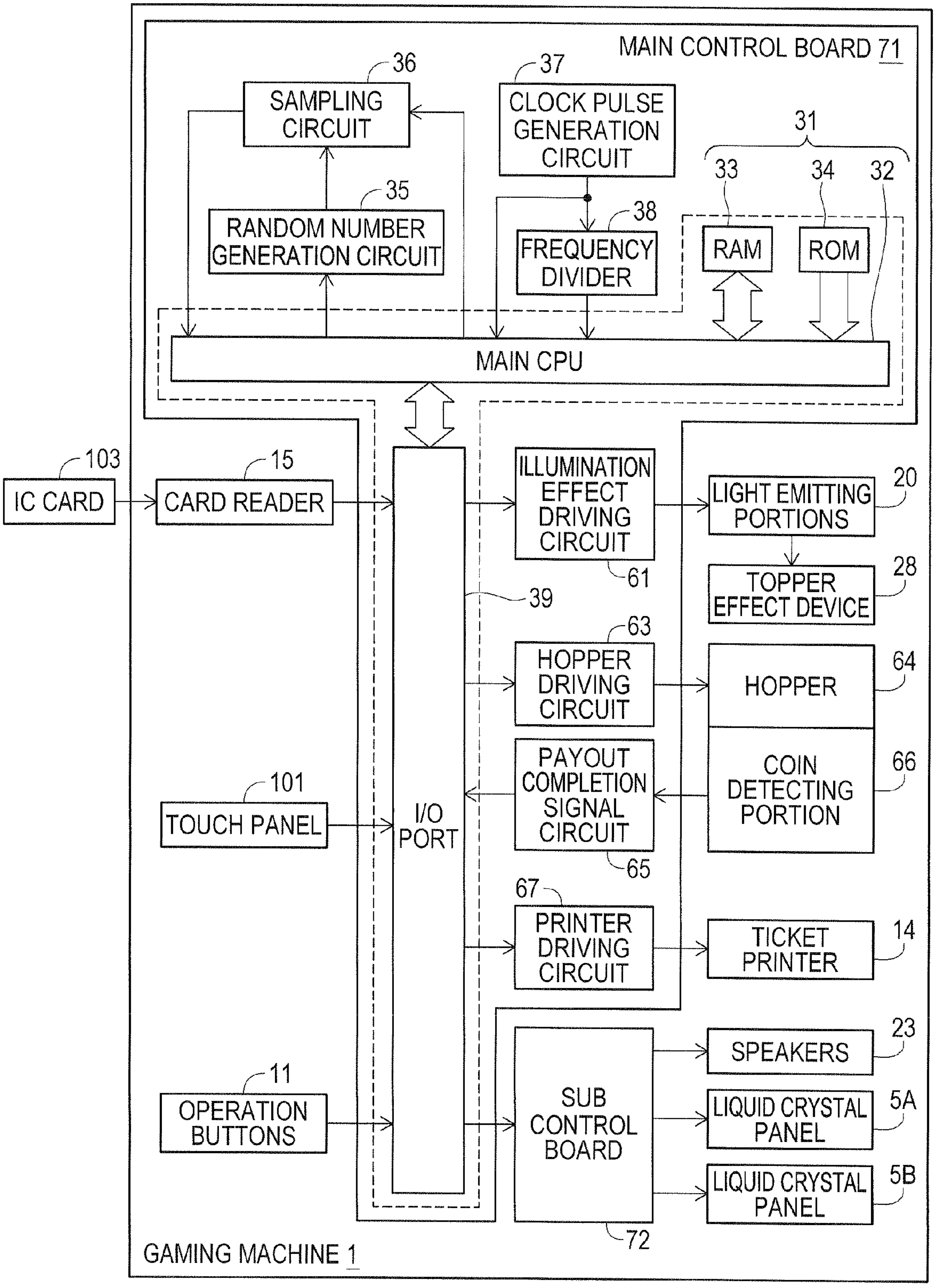
FIG. 4 is a block diagram showing an internal configuration of the gaming machine.

Next, an internal configuration of the gaming machine 1 will be described by referring to FIG. 4 and FIG. 5. FIG. 4 is a block diagram showing an internal configuration of the gaming machine 1.

As shown in FIG. 4, the gaming machine 1 includes a plurality of components such as a main control board 71 in which a microcomputer 31 is included. The main control board 71 includes the microcomputer 31, a random number generation circuit 35, a sampling circuit 36, a clock pulse generation circuit 37 and a frequency divider 38, and further includes an illumination effect driving circuit 61, a hopper driving circuit 63, a payout completion signal circuit 65 and a printer driving circuit 67.

The microcomputer 31 includes a main CPU 32, a RAM 33 and a ROM 34. The main CPU 32 operates in accordance with programs stored in the ROM 34 and performs input and output to and from the other components via an I/O port 39 to carry out an operation control over the gaming machine 1. The RAM 33 stores data or programs to be used during an operation of the main CPU 32. For example, random numbers which are sampled by the sampling circuit 36 are stored temporarily after a start of a game in the RAM 33. Also, a value of each variable described below, code numbers of the respective video reels R1, R2 and R3 and symbol numbers are stored in the RAM 33. The ROM 34 stores programs or static data (a table as shown in FIG. 6 below and tables as shown in FIGS. 14-26 below, for example).

The programs stored in the ROM 34 include game programs and a game system program (hereinafter referred to as the game program and the like). The game programs further include a lottery program to be used while a game is conducted.

The lottery program is a program used to determine the code numbers of the respective video reels R1, R2 and R3 that correspond to each symbol rearranged on the pay line L of the liquid crystal panel 5B. Then, in the lottery program, it is included symbol weighing data corresponding to each of plural kinds of payout rates (for example, 80%, 84%, and 88%). The symbol weighing data are the data indicating correlation between the code number of each video reel R1, R2 and R3 and one or plural random numbers belonging to a predetermined number range (0 to 255), every each of the thee video reels R1, R2 and R3. In other words, each of the code numbers of one video reel R1, R2 and R3 is associated with one or more random numbers corresponding to the payout rate. The random numbers are extracted by the lottery program, and symbols specified finally by the random numbers are rearranged on the pay line L of the liquid crystal panel 5B.

Random numbers over a predetermined range are generated by the random number generation circuit 35, which is operated based on instructions from the main CPU 32. The random numbers are voluntarily extracted from the random numbers generated by the random number generation circuit 35 by the sampling circuit 36, based on instructions from the main CPU 32, and the extracted random numbers are input to the main CPU 32. The base clock for running the main CPU 32 is generated by the clock pulse generation circuit 37. The signals which are generated by dividing the base clock in a predetermined frequency are input to the main CPU 32 by the frequency divider 38.

Further, the touch panel 101 is connected to the main control board 71. The touch panel 101 is arranged in front of the liquid crystal panel 5B, and specifies a coordinate position of a portion touched by a player. The position on which the player touched and a direction of a movement of the touched portion are determined based on information of the specified coordinate position. And signals corresponding to the determination are input to the main CPU 32 via the I/O port 39.

Furthermore, the operation buttons 11 including the BET button, the game start button, the collect button, the CASH-OUT button, the indicating-Japan button, the indicating-America button and the like are connected to the main control board 71. Signals corresponding to depressions of such buttons are inputted to the main CPU 32 via the I/O port 39.

Effect signals which are used to conduct illumination effect are output to the above-mentioned light emitting portion 20 and topper effect device 28 by the illumination effect driving circuit 61. And the topper effect device 28 is serially connected to the illumination effect driving circuit 61 via the light emitting portions 20.

A hopper 64 is driven by the hopper driving circuit 63 based on control of the main CPU 32. The hopper 64 executes payout of coins, and the coins are paid out from the coin tray 16. Data of the number of coins are input to the payout completion signal circuit 65 from a connected coin detecting portion 66. When the number of coins becomes a predetermined number, a signal indicating payout completion of coins is input to the main CPU 32 by the payout completion signal circuit 65. The number of coins paid out from the hopper 64 is calculated by the coin detecting portion 66, and data of the number calculated are input to the payout completion signal circuit 65 by the coin detecting portion 66. The ticket printer 14 is driven by the printer driving circuit 67 based on control of the main CPU 32.

Furthermore, the card reader 15 is connected to the main control board 71. The card reader 15 reads out information stored in an IC card 103 and inputs the read information to the main CPU 32. A player can now load an IC card 103 in the card reader 15. Then, a player can remove the IC card 103 loaded in the card reader 15.

Further, a sub control board 72 is connected to the main control board 71. The liquid crystal panel 5A, the liquid crystal panel 5B and the speakers 23 are connected to the sub control board 72.

Figure 5:
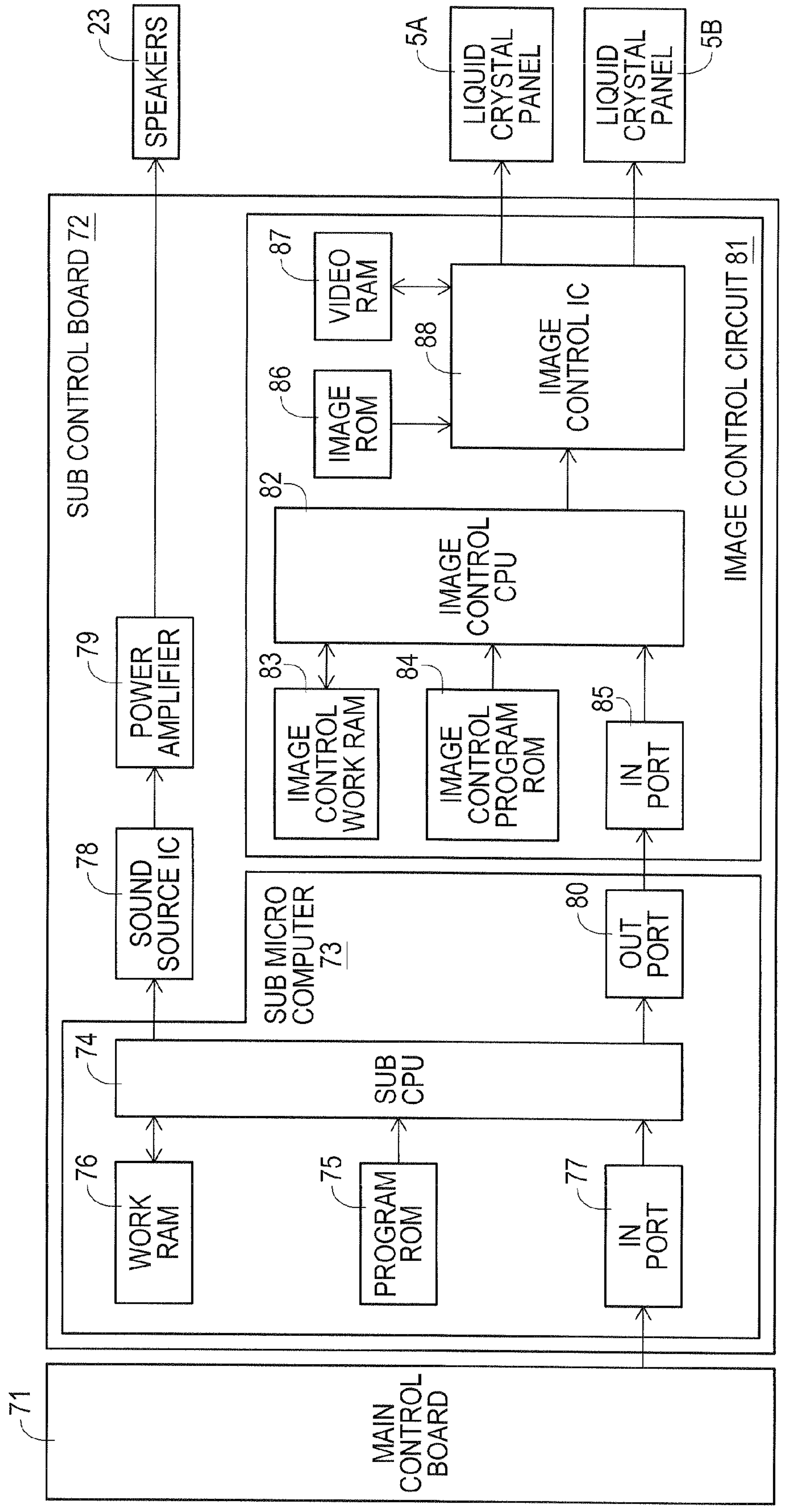
FIG. 5 is a block diagram showing an internal configuration of a sub control board which is provided in the gaming machine.

FIG. 5 is a block diagram showing an internal configuration of the sub control board 72. As shown in FIG. 5, the sub control board 72 performs display control of the liquid crystal panel 5A and the liquid crystal panel 5B and output control of sound from the speakers 23, by inputting commands from the main control board 71. The sub control board 72 is arranged on a circuit board which is different from a circuit board constituting the main control board 71. The sub control board 72 is mainly consisted of a microcomputer (hereinafter referred to as "sub microcomputer") 73 and includes a sound source IC 78 for controlling sound outputted from the speakers 23, a power amplifier 79 as an amplifier, and an image control circuit 81 working as display control means for the liquid crystal panels 5A and 5B.

The sub microcomputer 73 includes a sub CPU 74 performing control operation in accordance with a control command sent from the main control board 71, a program ROM 75 as memory means, a work RAM 76, and I/O ports 77 and 80. The sub control board 72 is not provided with a clock pulse generation circuit, a frequency divider, a random number generation circuit and a sampling circuit. However, the sub control board 72 is configured to perform random number sampling in an operation program of the sub CPU 74. The program ROM 75 stores a control program conducted on the sub CPU 74. The work RAM 76 is provided as temporal memory means when conducting the above control program on the sub CPU 74.

The image control circuit 81 includes an image control CPU 82, an image control work RAM 83, an image control program ROM 84, an IN port 85, an image ROM 86, a video RAM 87, and an image control IC 88. Based on parameters set by the sub microcomputer 73, the image control CPU 82 determines images to be displayed on the liquid crystal panels 5A and 5B, in accordance with an image control program stored in the image control program ROM 84. Further, the image control circuit 81 conducts display control of the liquid crystal panels 5B based on a control signal from the main CPU 32.

The image control program ROM 84 stores an image control program concerning display of the liquid crystal panels 5A and 5B and various selection tables. The image control work RAM 83 is provided as temporal memory means when conducting the image control program on the image control CPU 82. The image control IC 88 forms images based on a determination by the image control CPU 82 to output on the liquid crystal panels 5A and 5B.

The image ROM 86 stores dot data for forming an image. The image ROM 86, too, stores image dot data of tables shown in FIG. 13 described below and FIG. 30 described below.

[4. Display of the Liquid Crystal Panel]

Here will be described an image to be displayed on the liquid crystal panel 5B. FIGS. 7-12 are views showing one example of images to be displayed on the liquid crystal panel 5B. As shown in FIGS. 7-12, the liquid crystal panel 5B is divided into the screen H1 described above, the screen H2 described above and the screen H3 described above.

The screen H2 of the liquid crystal panel 5B displays an image representing a state of a game being conducted on the gaming machine 1. FIGS. 7-12 show images representing conduct states of a video slot game.

Figure 7:
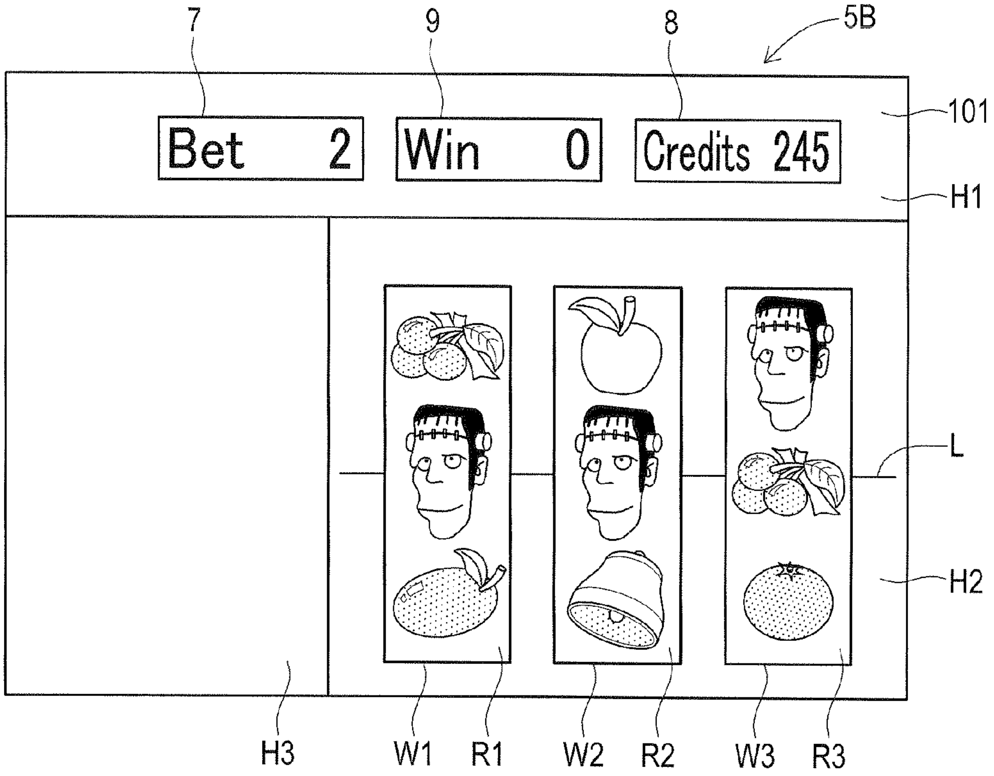
FIG. 7 is a view showing one example of images to be displayed on a liquid crystal panel which is provided in the gaming machine.
Figure 8:
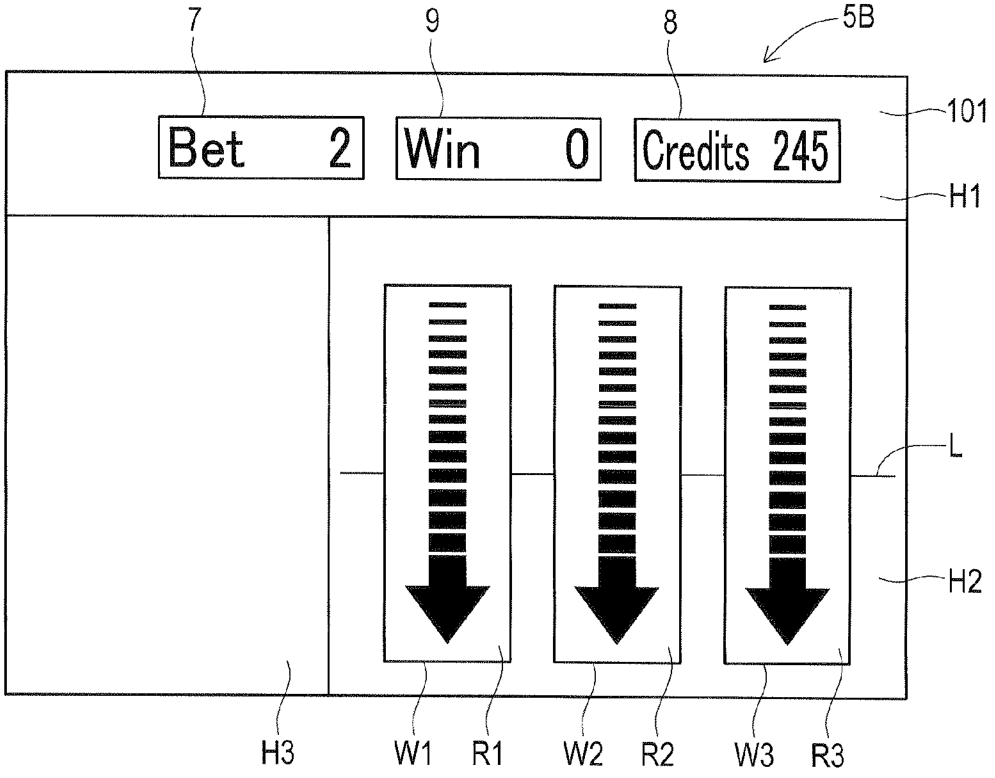
FIG. 8 is a view showing one example of images to be displayed on the liquid crystal panel which is provided in the gaming machine.
Figure 9:
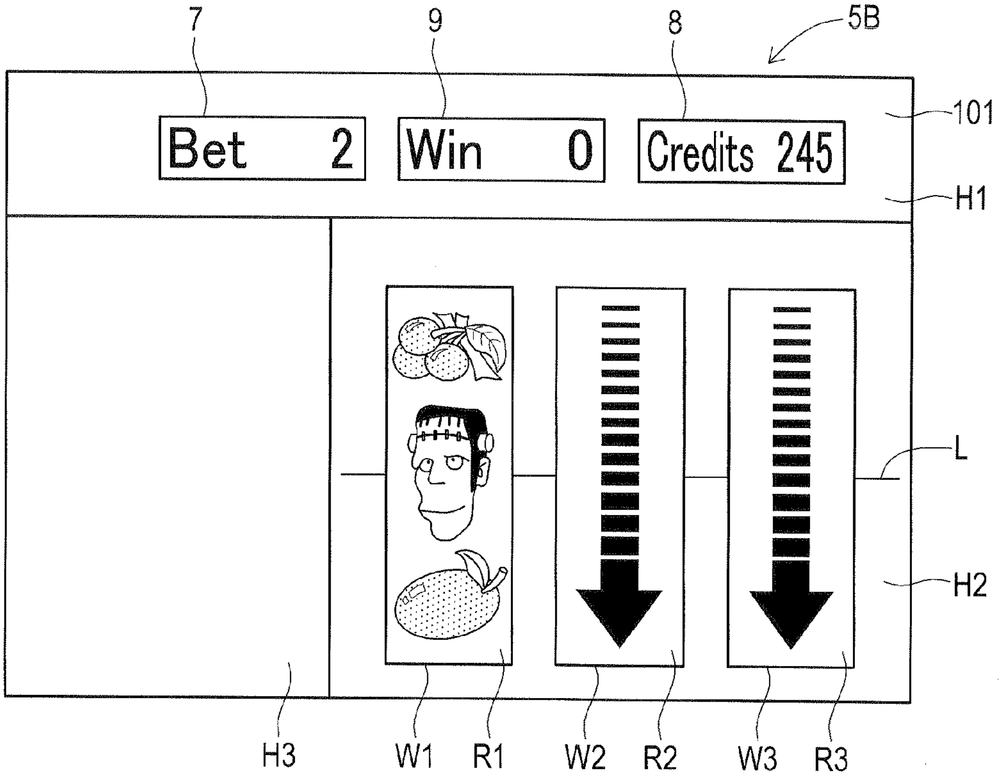
FIG. 9 is a view showing one example of images to be displayed on the liquid crystal panel which is provided in the gaming machine.
Figure 10:
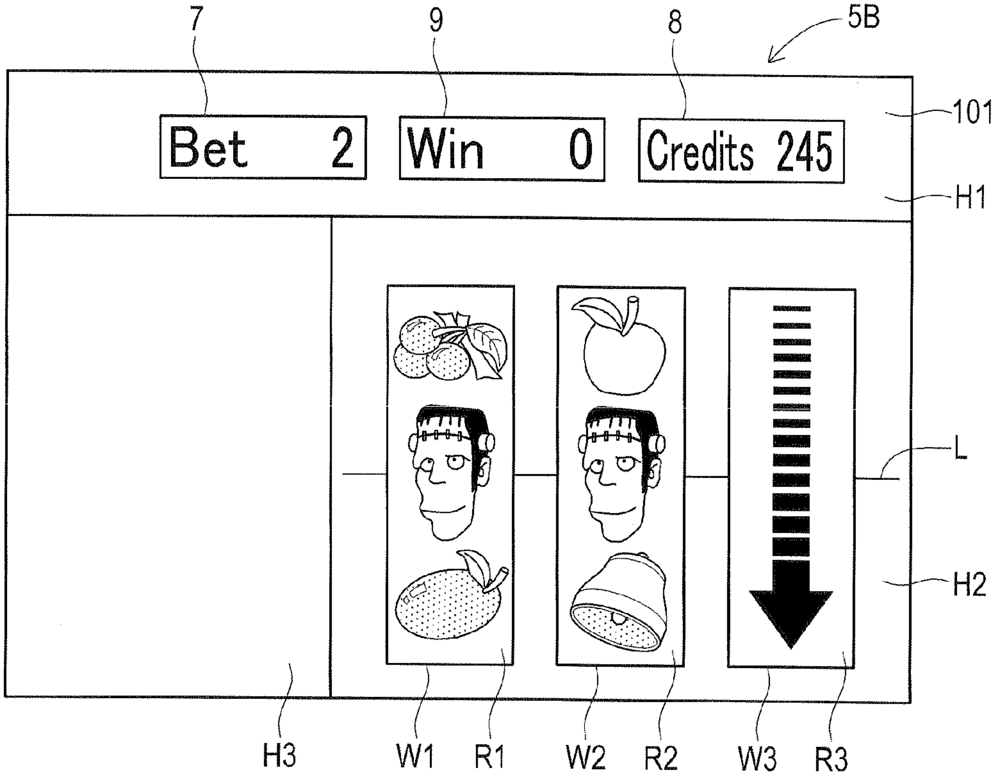
FIG. 10 is a view showing one example of images to be displayed on the liquid crystal panel which is provided in the gaming machine.
Figure 11:
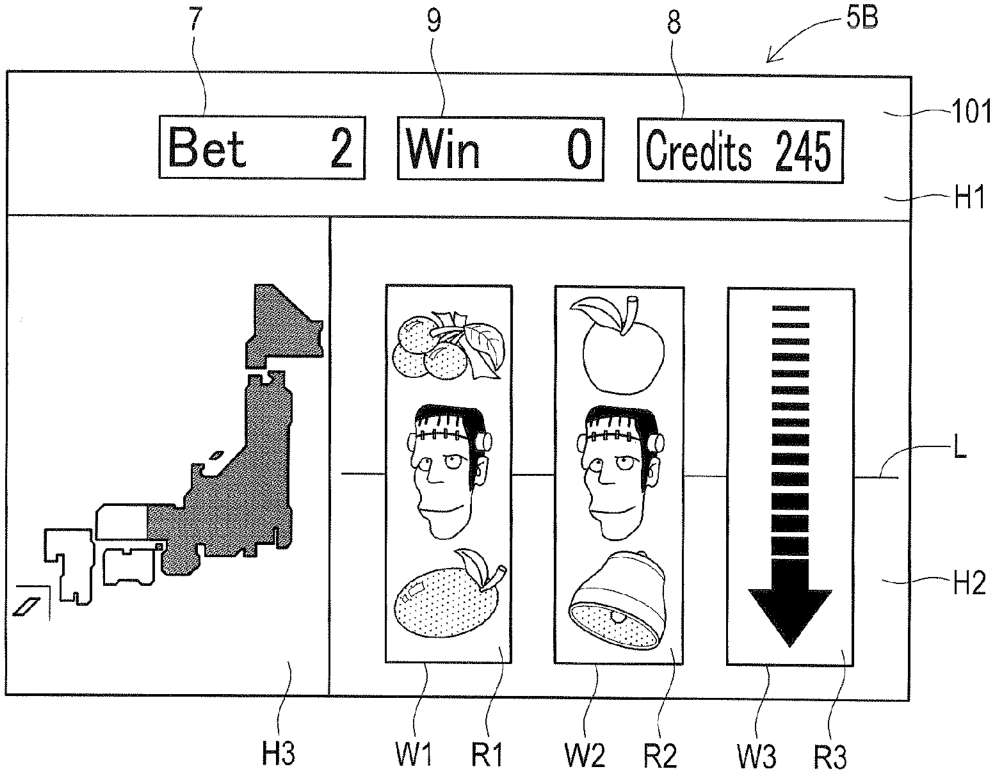
FIG. 11 is a view showing one example of images to be displayed on the liquid crystal panel which is provided in the gaming machine.
Figure 12:
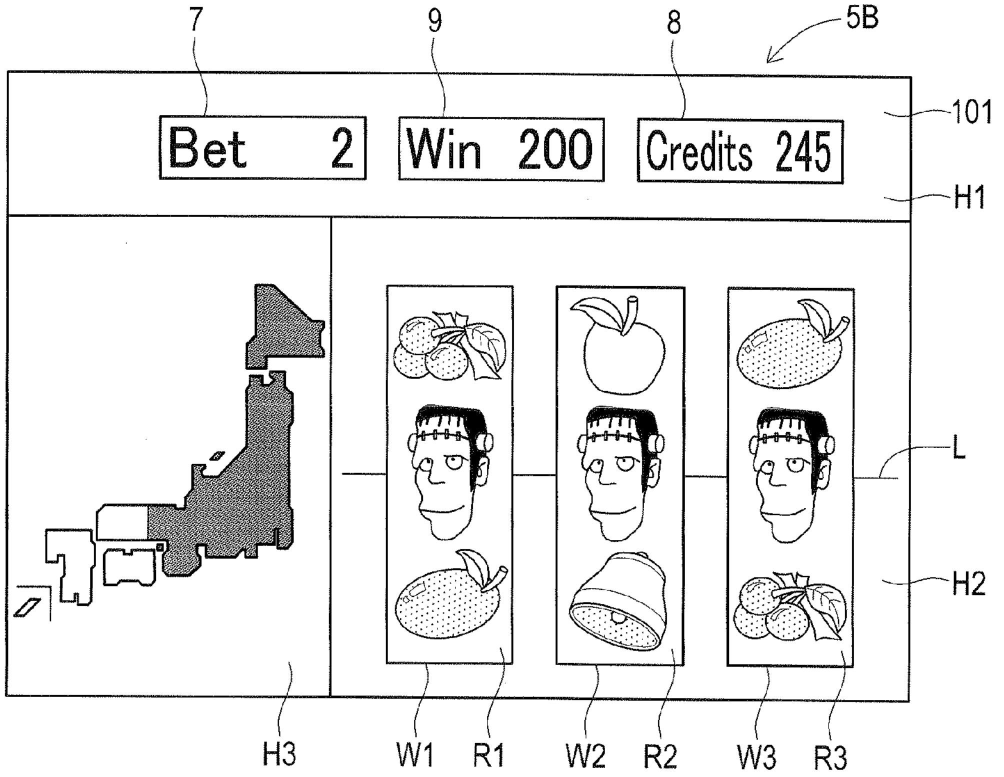
FIG. 12 is a view showing one example of images to be displayed on the liquid crystal panel which is provided in the gaming machine.

During a slot game, as shown in FIGS. 7-12, symbols drawn on the reel band of each video reel R1, R2 and R3 are displayed on each of display windows W1, W2, and W3 in the screen H2 of the liquid crystal panel 5B. FIGS. 7 and 12 show a state in which the symbols drawn on the reel band of each video reel R1, R2 and R3 are arranged or rearranged on each symbol display W1, W2 and W3 of the liquid crystal panel 5B. FIGS. 8-11 show a state in which symbols drawn on the reel band of each video reel R1, R2 and R3 are displayed by a scrolling manner in any one of symbol displays W1, W2 and W3 of the liquid crystal panel 5B. Incidentally, on the reel band of each video reel R1, R2 and R3, a symbol column constructed from twenty-two symbols is drawn respectively (refer to FIG. 3 below).

Further, the bet amount display portion 7 described above, the credit amount display portion 8 described above and the payout amount display portion 9 described above are arranged on the screen H1 of the liquid crystal panel 5B. On the bet amount display portion 7, a bet amount which is indicated by a player in a unit game of a slot game is displayed. On the credit amount display portion 8, a credit amount which is owned by a player at the moment is displayed. On the payout amount display portion 9, a payout amount awarded in a unit game of a slot game to a player is displayed.

Accordingly, in the screen H2 of the liquid crystal panel 5B during a slot game, symbols of respective video reels R1, R2, and R3 are arranged three by three on each display window W1, W2, and W3. Furthermore, in the liquid crystal panel 5B during a slot game, as shown in FIGS. 7-12, one pay line L, which horizontally crosses each display window W1, W2, and W3, is displayed. The pay line L is used to specify a combination of symbols.

Incidentally, an image to be displayed on the screen H2 of the liquid crystal panel 5B is not restricted to an image concerning a conduct state of a video slot game. That is, the screen H2 of the liquid crystal panel 5B displays an image concerning a state of various games that can be conducted on the gaming machine 1. Other than slot games, games that can be conducted on the gaming machine 1 include card games, roulette games, dice games and mah-jong games, for example.

Meanwhile, while symbols drawn on the reel band of the video reel R3 are displayed rotating in the display window W3, the map of Japan is displayed as shown in FIGS. 10-12 on the screen H3 of the liquid crystal panel 5B. Further, a territory corresponding to a player is distinguished by color on the map of Japan displayed on the screen H3.

[5. Outline of Symbols]

Subsequently, based on FIG. 3, symbols drawn on the reel band of each video reel R1, R2 and R3 will be described. These symbols are rearranged on each display window W1, W2 and W3 of the liquid crystal panel 5B during a slot game by being displayed by a scrolling manner and a stopped manner. FIG. 3 is a schematic view schematically-showing symbol columns drawn on the reel band of each video reel R1, R2 and R3.

On the reel band of each video reel R1, R2 and R3, twenty-two symbols are drawn respectively. Each symbol column is constructed from the symbols including "FRANKENSTEIN", "BLUE7", "BELL", "APPLE", "CHERRY", "STRAWBERRY", "PLUM" and "ORANGE". And the symbols of the predetermined types are arranged in a predetermined sequence.

If three of any of the following symbols: "FRANKENSTEIN", "BLUE7", "BELL", "APPLE", "CHERRY", "STRAWBERRY", "PLUM" and "ORANGE" have been rearranged on the pay line L of the liquid crystal panel 5B, an amount obtained by multiplying a predetermined payout amount with a bet amount is awarded to a player (refer to FIG. 6 below). If one or two of symbols "CHERRY" or "ORANGE" have been rearranged on the pay line L of the liquid crystal panel 5B, an amount obtained by multiplying a predetermined payout amount with a bet amount is awarded to a player in accordance with the number of the rearranged symbols (refer to FIG. 6 below).

Incidentally, in each symbol column shown in FIG. 3, a symbol number is allocated with respect to each symbol constituting these symbol columns, starting from the top.

[6. Outline of a Slot Game]

Next, winning combinations and payout amounts corresponding to the winning combinations will be described with reference to FIG. 6, wherein the winning combinations are symbol combinations when a slot game is conducted by using each video reel R1, R2 and R3 in the gaming machine 1. FIG. 6 is a payout table in which the winning combinations and the payout amounts corresponding to the winning combinations are shown when a slot game is conducted by using each video reel R1, R2 and R3 in the gaming machine 1.

Here, the payout amounts shown in FIG. 6 indicate payout amounts when a bet amount is "1" in a slot game. Therefore, when a bet amount is "1", the payout amount shown in FIG. 6 is awarded, and when a bet amount is more than "2", an amount obtained by multiplying the payout amount shown in FIG. 6 with the bet amount is awarded.

Thereby, when three symbols "FRANKENSTEIN" are rearranged on the pay line L of the liquid crystal panel 5B, an amount obtained by multiplying "100" with a bet amount is awarded. When three symbols "BLUE 7" are rearranged on the pay line L of the liquid crystal panel 5B, an amount obtained by multiplying "10" with a bet amount is awarded. When three symbols "BELL" are rearranged on the pay line L of the liquid crystal panel 5B, an amount obtained by multiplying "8" with a bet amount is awarded. Payout amounts corresponding to each of the winning combinations shown in FIG. 6 are set as the same in the above.

In addition, when three symbols "FRANKENSTEIN" are rearranged on the pay line L of the liquid crystal panel 5B, a bonus game trigger is realized, a free game is generated. Also, in the free game, the bonus game trigger may be realized, at that time, a new free game is generated.

However, when a symbol combination constructed from the symbols rearranged on the pay line L of the liquid crystal panel 5B is not any of the winning combinations shown in FIG. 6, the symbol combination is not a winning combination. Therefore, no payout amount may be awarded.

As mentioned above, in the gaming machine 1, a unit game of a slot game is conducted.

In other words, in a unit of a slot game, a game is conducted by rearranging a specific symbol combination by using each video reel R1, R2 and R3 on the pay line L in the screen H2 of the liquid crystal panel 5B. In a slot game, firstly, a part of symbol column (three symbols) drawn on the reel band of each video reel R1, R2 and R3 shown in FIG. 3, is arranged on each display window W1, W2 and W3 of the liquid crystal panel 5B (refer to FIGS. 7 and 12). Here, after a player sets a bet amount by depressing the BET button from the operation buttons 11, if the player depresses the game start button from the operation buttons 11, each video reel R1, R2 and R3 is displayed by a scrolling manner, the symbol column drawn on the reel band of each video reel R1, R2 and R3 shown in FIG. 3, is scrolled from up to down and displayed on each display window W1, W2 and W3 in the screen H2 of the liquid crystal panel 5B (refer to FIG. 8).

After a predetermined time, each video reel R1, R2 and R3 automatically is sequentially-displayed by a stopped manner, a part of the symbol column (three symbols) drawn on the reel band of each video reel R1, R2 and R3 shown in FIG. 3, is rearranged on each display window W1, W2 and W3 of the liquid crystal panel 5B (refer to FIGS. 8-11). Meanwhile, each winning combination based on each symbol combination is determined beforehand (refer to FIG. 6). When a symbol combination constructed from the three symbols rearranged on the pay line L in the screen H2 of the liquid crystal panel 5B, realizes a winning combination, an amount obtained by multiplying a payout amount corresponding to the realized winning combination with the bet amount is awarded to the player.

[7. Display of a Territory]

As described above, the map of Japan is displayed on the screen 113 of the liquid crystal panel 5B as shown in the second, third and fourth stages of FIG. 1 while the symbols are scrolling in the display window W3 only (refer to FIGS. 10-12). Otherwise, although not shown, the map of America is displayed instead of the map of Japan. Further, a territory corresponding to a player is distinguished by color on the map of Japan or the map of America displayed on the screen 113.

Here, the territory which is indicated on the map of Japan or the map of America and which corresponds to the player is correlated with a payout amount corresponding to a combination of three symbols rearranged on the pay line L in terms of probability. In other words, if the payout amount corresponding to the combination of three symbols rearranged on the pay line L becomes larger, the territory corresponding to the player is more likely to be displayed larger on the map of Japan or the map of America. Contrary to this, if the payout amount corresponding to the combination of three symbols rearranged on the pay line L becomes smaller, the territory corresponding to the player is more likely to be displayed smaller on the map of Japan or the map of America. Such a correlation in terms of probability is realized by a probability table provided for each combination of three symbols rearranged on the pay line L (each game result).

Here, probability tables for realizing the correlation in terms of probability will be described based on FIGS. 14-25. These probability tables are stored in the ROM 34. The probability tables, that are shown in FIGS. 14-25, associate plurality of random numbers ranging from "0" to "255" with territory parameters of "1", "2" and "3".

In other words, there are three parameters of "1", "2" and "3" as the territory parameters corresponding to a player. The territory parameter of "1" means the largest in size, the territory parameter of "3" means the smallest in size, and the territory parameter of "2" means intermediate between them in size.

FIG. 14 is a view showing a probability table which defines a correlation between a combination of three symbols "FRANKENSTEIN" rearranged on the pay line L of the liquid crystal panel 5B (its corresponding payout amount) and a territory corresponding to a player. Incidentally, a payout amount corresponding to the combination of three symbols "FRANKENSTEIN" rearranged on the pay line L of the liquid crystal panel 5B is "100" (refer to FIG. 6 described above).

As shown in FIG. 14, in a case that three symbols "FRANKENSTEIN" are rearranged on the pay line L of the liquid crystal panel 5B, each random number value ranging from "0" to "149" is associated with the territory parameter of "1", each random number value ranging from "150" to "229" is associated with the territory parameter of "2", and each random number value ranging from "230" to "255" is associated with the territory parameter of "3".

FIG. 15 is a view showing a probability table which defines a correlation between a combination of three symbols "BLUE7" rearranged on the pay line L of the liquid crystal panel 5B (its corresponding payout amount) and a territory corresponding to a player. Incidentally, a payout amount corresponding to the combination of three symbols "BLUE7" rearranged on the pay line L of the liquid crystal panel 5B is "10" (refer to FIG. 6 described above).

As shown in FIG. 15, in a case that three symbols "BLUE7" are rearranged on the pay line L of the liquid crystal panel 5B, each random number value ranging from "0" to "99" is associated with the territory parameter of "1", each random number value ranging from "100" to "199" is associated with the territory parameter of "2", and each random number value ranging from "200" to "255" is associated with the territory parameter of "3".

FIG. 16 is a view showing a probability table which defines a correlation between a combination of three symbols "BELL" rearranged on the pay line L of the liquid crystal panel 5B (its corresponding payout amount) and a territory corresponding to a player. Incidentally, a payout amount corresponding to the combination of three symbols "BELL" rearranged on the pay line L of the liquid crystal panel 5B is "8" (refer to FIG. 6 described above).

As shown in FIG. 16, in a case that three symbols "BELL" are rearranged on the pay line L of the liquid crystal panel 5B, each random number value ranging from "0" to "89" is associated with the territory parameter of "1", each random number value ranging from "90" to "195" is associated with the territory parameter of "2", and each random number value ranging from "196" to "255" is associated with the territory parameter of "3".

FIG. 17 is a view showing a probability table which defines a correlation between a combination of three symbols "APPLE" rearranged on the pay line L of the liquid crystal panel 5B (its corresponding payout amount) and a territory corresponding to a player. Incidentally, a payout amount corresponding to the combination of three symbols "APPLE" rearranged on the pay line L of the liquid crystal panel 5B is "7" (refer to FIG. 6 described above).

As shown in FIG. 17, in a case that three symbols "APPEE" are rearranged on the pay line L of the liquid crystal panel 5B, each random number value ranging from "0" to "79" is associated with the territory parameter of "1", each random number value ranging from "80" to "189" is associated with the territory parameter of "2", and each random number value ranging from "190" to "255" is associated with the territory parameter of "3".

FIG. 18 is a view showing a probability table which defines a correlation between a combination of three symbols "CHERRY" rearranged on the pay line L of the liquid crystal panel 5B (its corresponding payout amount) and a territory corresponding to a player. Incidentally, a payout amount corresponding to the combination of three symbols "CHERRY" rearranged on the pay line L of the liquid crystal panel 5B is "5" (refer to FIG. 6 described above).

As shown in FIG. 18, in a case that three symbols "CHERRY" are rearranged on the pay line L of the liquid crystal panel 5B, each random number value ranging from "0" to "69" is associated with the territory parameter of "1", each random number value ranging from "70" to "185" is associated with the territory parameter of "2", and each random number value ranging from "186" to "255" is associated with the territory parameter of "3".

FIG. 19 is a view showing a probability table which defines a correlation between a combination of three symbols "STRAWBERRY" rearranged on the pay line L of the liquid crystal panel 5B (its corresponding payout amount) and a territory corresponding to a player. Incidentally, a payout amount corresponding to the combination of three symbols "STRAWBERRY" rearranged on the pay line L of the liquid crystal panel 5B is "5" (refer to FIG. 6 described above). This payout amount is the same as that of the case of the combination of "CHERRY" symbols.

As shown in FIG. 19, in a case that three symbols "STRAWBERRY" are rearranged on the pay line L of the liquid crystal panel 5B, each random number value ranging from "0" to "69" is associated with the territory parameter of "1", each random number value ranging from "70" to "185" is associated with the territory parameter of "2", and each random number value ranging from "186" to "255" is associated with the territory parameter of "3". This association is the same as that of the case of the combination of "CHERRY" symbols.

FIG. 20 is a view showing a probability table which defines a correlation between a combination of three symbols "PLUM" rearranged on the pay line L of the liquid crystal panel 5B (its corresponding payout amount) and a territory corresponding to a player. Incidentally, a payout amount corresponding to the combination of three symbols "PLUM" rearranged on the pay line L of the liquid crystal panel 5B is "4" (refer to FIG. 6 described above).

As shown in FIG. 20, in a case that three symbols "PLUM" are rearranged on the pay line L of the liquid crystal panel 5B, each random number value ranging from “0” to “59” is associated with the territory parameter of “1”, each random number value ranging from “60” to “179” is associated with the territory parameter of “2”, and each random number value ranging from “180” to “255” is associated with the territory parameter of “3”.

FIG. 21 is a view showing a probability table which defines a correlation between a combination of three symbols “ORANGE” rearranged on the pay line L of the liquid crystal panel 5B (its corresponding payout amount) and a territory corresponding to a player. Incidentally, a payout amount corresponding to the combination of three symbols “ORANGE” rearranged on the pay line L of the liquid crystal panel 5B is “3” (refer to FIG. 6 described above).

As shown in FIG. 21, in a case that three symbols “ORANGE” are rearranged on the pay line L of the liquid crystal panel 5B, each random number value ranging from “0” to “49” is associated with the territory parameter of “1”, each random number value ranging from “50” to “175” is associated with the territory parameter of “2”, and each random number value ranging from “176” to “255” is associated with the territory parameter of “3”.

FIG. 22 is a view showing a probability table which defines a correlation between a combination of three symbols “CHERRY”, “CHERRY” and “ANY” rearranged on the pay line L of the liquid crystal panel 5B (its corresponding payout amount) and a territory corresponding to a player. Incidentally, “ANY” means any one of symbols. A payout amount corresponding to this symbol combination is “2” (refer to FIG. 6 described above).

As shown in FIG. 22, in a case that three symbols “CHERRY”, “CHERRY” and “ANY” are rearranged on the pay line L of the liquid crystal panel 5B, each random number value ranging from “0” to “19” is associated with the territory parameter of “1”, each random number value ranging from “20” to “99” is associated with the territory parameter of “2”, and each random number value ranging from “100” to “255” is associated with the territory parameter of “3”.

FIG. 23 is a view showing a probability table which defines a correlation between a combination of three symbols “ORANGE”, “ORANGE” and “ANY” rearranged on the pay line L of the liquid crystal panel 5B (its corresponding payout amount) and a territory corresponding to a player. Incidentally, “ANY” means any one of symbols. A payout amount corresponding to this symbol combination is “2” (refer to FIG. 6 described above). This payout amount is the same as that of the case of the combination of “CHERRY”, “CHERRY” and “ANY”.

As shown in FIG. 23, in a case that three symbols “ORANGE”, “ORANGE” and “ANY” are rearranged on the pay line L of the liquid crystal panel 5B, each random number value ranging from “0” to “19” is associated with the territory parameter of “1”, each random number value ranging from “20” to “99” is associated with the territory parameter of “2”, and each random number value ranging from “100” to “255” is associated with the territory parameter of “3”. This association is the same as that of the case of the combination of “CHERRY”, “CHERRY” and “ANY”.

FIG. 24 is a view showing a probability table which defines a correlation between a combination of three symbols “CHERRY”, “ANY” and “ANY” rearranged on the pay line L of the liquid crystal panel 5B (its corresponding payout amount) and a territory corresponding to a player. Incidentally, “ANY” means any one of symbols. A payout amount corresponding to this symbol combination is “1” (refer to FIG. 6 described above).

As shown in FIG. 24, in a case that three symbols “CHERRY”, “ANY” and “ANY” are rearranged on the pay line L of the liquid crystal panel 5B, each random number value ranging from “0” to “9” is associated with the territory parameter of “1”, each random number value ranging from “10” to “95” is associated with the territory parameter of “2”, and each random number value ranging from “96” to “255” is associated with the territory parameter of “3”.

FIG. 25 is a view showing a probability table which defines a correlation between a combination of three symbols “ORANGE”, “ANY” and “ANY” rearranged on the pay line L of the liquid crystal panel 5B (its corresponding payout amount) and a territory corresponding to a player. Incidentally, “ANY” means any one of symbols. A payout amount corresponding to this symbol combination is “1” (refer to FIG. 6 described above). This payout amount is the same as that of the case of the combination of “CHERRY”, “ANY” and “ANY”.

As shown in FIG. 25, in a case that three symbols “ORANGE”, “ANY” and “ANY” are rearranged on the pay line L of the liquid crystal panel 5B, each random number value ranging from “0” to “9” is associated with the territory parameter of “1”, each random number value ranging from “10” to “95” is associated with the territory parameter of “2”, and each random number value ranging from “96” to “255” is associated with the territory parameter of “3”. This association is the same as that of the case of the combination of “CHERRY”, “ANY” and “ANY”.

Next, there will be described the territory parameters of “1”, “2” or “3”. As described above, the territory parameter of “1” means the largest in size, the territory parameter of “3” means the smallest in size and the territory parameter of “2” means intermediate between them in size.

FIG. 13 is a view showing a table which defines a correlation between the territory parameter of “1”, “2” or “3” and an image which is showing the size of a territory corresponding to a player on the map of Japan. This table is stored in the image ROM 86.

In the table shown in FIG. 13, the territory parameter of “1” is associated with an image which is showing all of Japanese territory as the size of a territory corresponding to a player on the map of Japan, the territory parameter of “2” is associated with an image which is showing two-thirds of Japanese territory as the size of a territory corresponding to a player on the map of Japan, and the territory parameter of “3” is associated with an image which is showing one-half of Japanese territory as the size of a territory corresponding to a player on the map of Japan.

FIG. 30 is a view showing a table which defines a correlation between the territory parameter of “1”, “2” or “3” and an image which is showing the size of a territory corresponding to a player on the map of America. This table is stored in the image ROM 86.

In the table shown in FIG. 30, the territory parameter of “1” is associated with an image which is showing all of American continental territory (excluding Alaska) as the size of a territory corresponding to a player on the map of America, the territory parameter of “2” is associated with an image which is showing one-half of American continental territory (excluding Alaska) as the size of a territory corresponding to a player on the map of America, and the territory parameter of “3” is associated with an image which is showing approximately one-eighth of American continental territory (excluding Alaska) as the size of a territory corresponding to a player on the map of America.

Figures 26, 27:
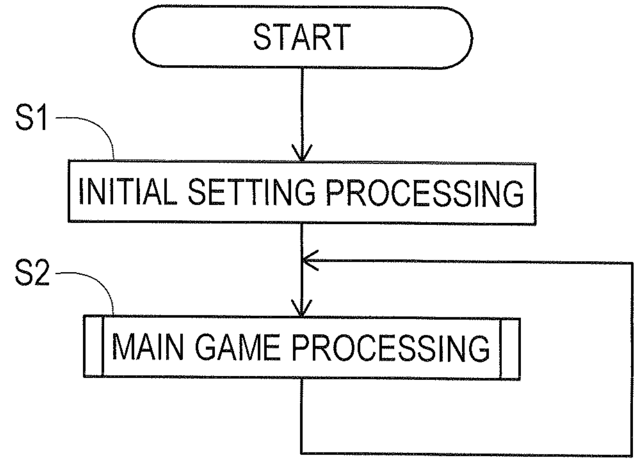
FIG. 26 is a view showing a display switch table.
FIG. 27 is a flowchart of a main control program.

Next, there will be described a display switching of the map of Japan or the map of America on the screen H3 of the liquid crystal panel 5B. This display switching is conducted in accordance with a display switch table as shown in FIG. 26. This display switch table is stored in the ROM 34. In the display switch table shown in FIG. 26, a switch parameter of "1" is associated with a country name parameter of "Japan", and a switch parameter of "2" is associated with a country name parameter of "America". Accordingly, if the switch parameter is "1", the map of Japan is displayed on the screen H3 of the liquid crystal panel 5B, if the switch parameter is "2", the map of America is displayed on the screen H3 of the liquid crystal panel 5B. Incidentally, the switch parameter is changed to "1" if the indicating-Japan button, which is one of the operation buttons 11, is depressed, and the switch parameter is changed to "2" if the indicating-America button, which is one of the operation buttons 11, is depressed.

[8. Operation in the Gaming Machine]

Subsequently, a main control program conducted in the gaming machine 1 will be described in detail with reference to the drawings. FIG. 27 is a flowchart of the main control program. Incidentally, each program shown in the flowchart of FIG. 27 is stored in the ROM 34 or the RAM 33 of the gaming machine 1, and is conducted by the main CPU 32.

First, when a power switch is pressed (application of power), the microcomputer 31 is started to operate, an initial setting processing is conducted by the microcomputer 31 in step (abbreviated as "S") 1. In the initial setting processing, a BIOS stored in the ROM 34 is conducted by the main CPU 32. Compressed data included in the BIOS is expanded to the RAM 33, and when the BIOS expansion to the RAM 33 is conducted, a diagnosing and initialization processing of various peripheral devices are conducted. Also, the game programs and the like are written from the ROM 34 to the RAM 33 by the main CPU 32, so as to obtain the payout rate setting data and country ID information. Also, during the execution of the initial setting processing, a verification processing to each program is conducted by the main CPU 32.

And in S2, the main CPU 32 reads out the game programs and the like from the RAM 33, and conducts the programs in sequence so as to conduct a main game processing. The game is conducted in the gaming machine 1 by conducting the main game processing. And the main game processing is repeated in the gaming machine 1 when the power is supplied to the gaming machine 1.

Figure 28:
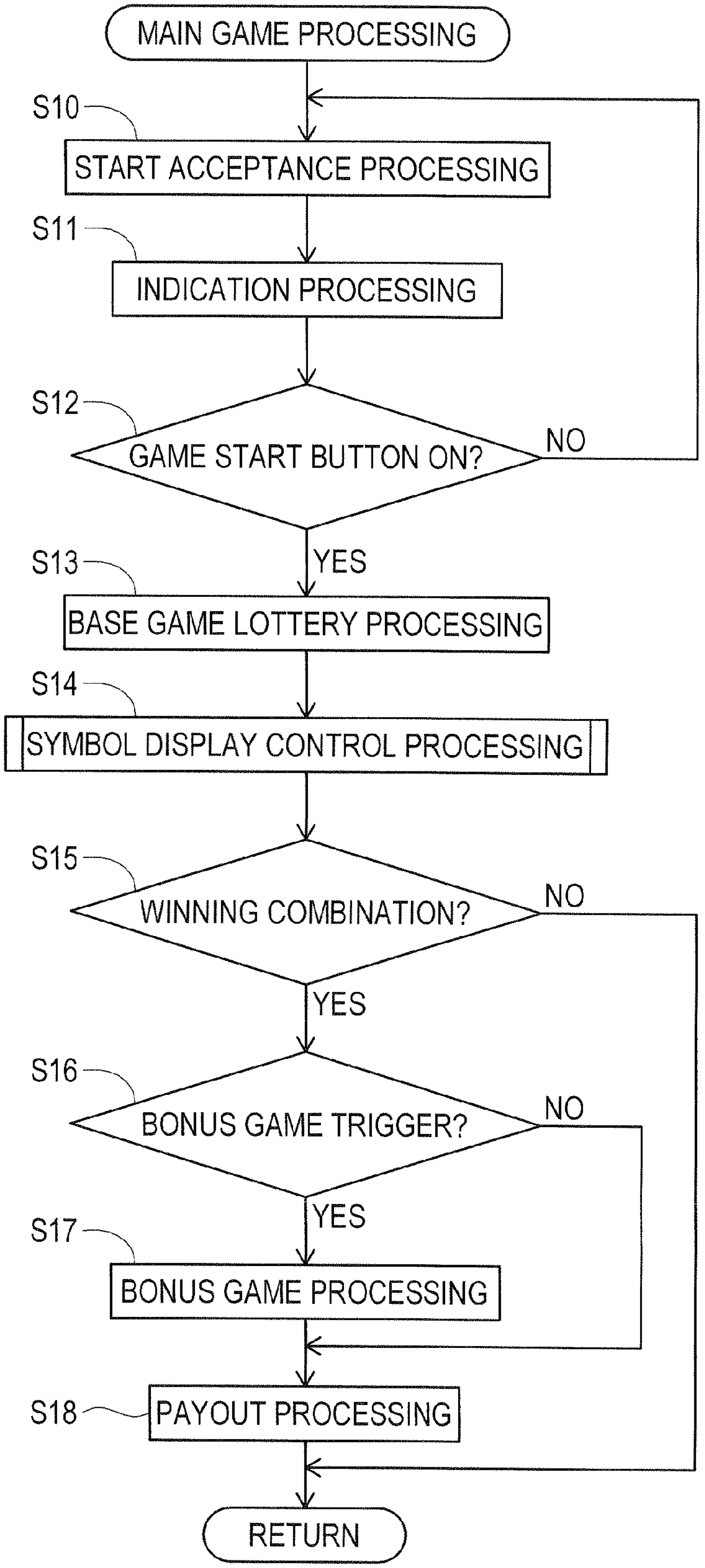
FIG. 28 is a flowchart of a main game processing program.

Next, a sub processing of the main game processing in S2 described above will be described based on FIG. 28. FIG. 28 is a flowchart of the main game processing program in the gaming machine 1. Incidentally, each program shown in the flowchart of FIG. 28 is stored in the ROM 34 or the RAM 33 of the gaming machine 1, and is conducted by the main CPU 32.

First, as shown in FIG. 28, a start acceptance processing is conducted by the main CPU 32 in S10. At this time, in the start acceptance processing, an insertion of coins or a bet operation using the BET button from the operation buttons 11 is conducted by a player.

Then, the main CPU 32 conducts an indication processing in S11. In this indication processing, when the main CPU 32 receives a signal in response to a depression of the indicating-Japan button which is one of the operation buttons 11, the main CPU 32 sets the switch parameter to "1". Otherwise, when the main CPU 32 receives a signal in response to a depression of the indicating-America button which is one of the operation buttons 11, the main CPU 32 sets the switch parameter to "2".

The switch parameter is initially set to "1" or "2" as initial value, by conducting the initial setting processing of S1 described above. A button depression operation to the indicating-Japan button and the indicating-America button that are the operation buttons 11 is disabled when a processing of S13 described below is conducted, and is enabled when a processing of S10 described above is conducted again.

Then, the main CPU 32 determines whether or not a spin button which is the game start button from the operation buttons 11 has been depressed in S12. Based on a signal inputted to the main CPU 32 in response to depressing the operation buttons 11, this determination is made. At this point, if the spin button from the operation buttons 11 has been not depressed (S12: NO), the processing is returned to the start acceptance processing (S11) again. Thereby, it is possible to change a bet amount and the like. In contrast, if the spin button from the operation buttons 11 has been depressed (S12: YES), the bet amount set based on the above bet operation is reduced from the credit amount owned by the player at the moment, and is stored in the RAM 33 as bet information. Incidentally, the credit amount after the reduction is also stored in the RAM 33 as credit information. Then, by sending a control signal to the sub control board 72, the main CPU 32 displays the credit information stored in the RAM 33 (the credit amount after the above reduction) on the credit amount display portion 8 in the liquid crystal panel 5B.

When the processing is shifted to S13, a base game lottery processing is conducted by the main CPU 32. Concretely, when the lottery program included in the game programs is conducted by the main CPU 32, a random number corresponding to each video reel R1, R2 and R3 respectively is selected from a range of "0" to "255". And with reference to the symbol weighing data corresponding to the payout rate setting data, based on the selected three random numbers, the code numbers of the respective video reels R1, R2 and R3 are determined. The determined code numbers of the respective video reels R1, R2 and R3 are stored in the RAM 33 by the main CPU 32, and the processing is shifted to S14.

Here, the code numbers of the respective video reels R1, R2 and R3 are associated with the symbol numbers (symbol numbers shown in FIG. 3) of symbols which are rearranged on the pay line L of the liquid crystal panel 5B. The main CPU 32 determines a symbol combination in a unit game by determining code numbers of the respective video reels R1, R2 and R3. For instance, if symbol numbers of the respective video reels R1, R2 and R3 are set to "21", "21" and "21" by determining code numbers of the respective video reels R1, R2 and R3 by the main CPU 32, the main CPU 32 decides for a symbol combination made up of three symbols "FRANKENSTEIN" (refer to FIG. 3), as a symbol combination in a unit game. Thus, a lottery for a symbol combination in a unit game of a slot game is conducted by determining code numbers of the respective video reels R1, R2 and R3.

Sifting to S14, the main CPU 32 conducts a symbol display control processing. Here, the symbol display control processing will be described based on FIG. 29. Incidentally, programs of the symbol display control processing shown in a flowchart of FIG. 29 are stored in the ROM 34 or the RAM 33 of the gaming machine 1, and are conducted by the main CPU 32.

Figure 29:
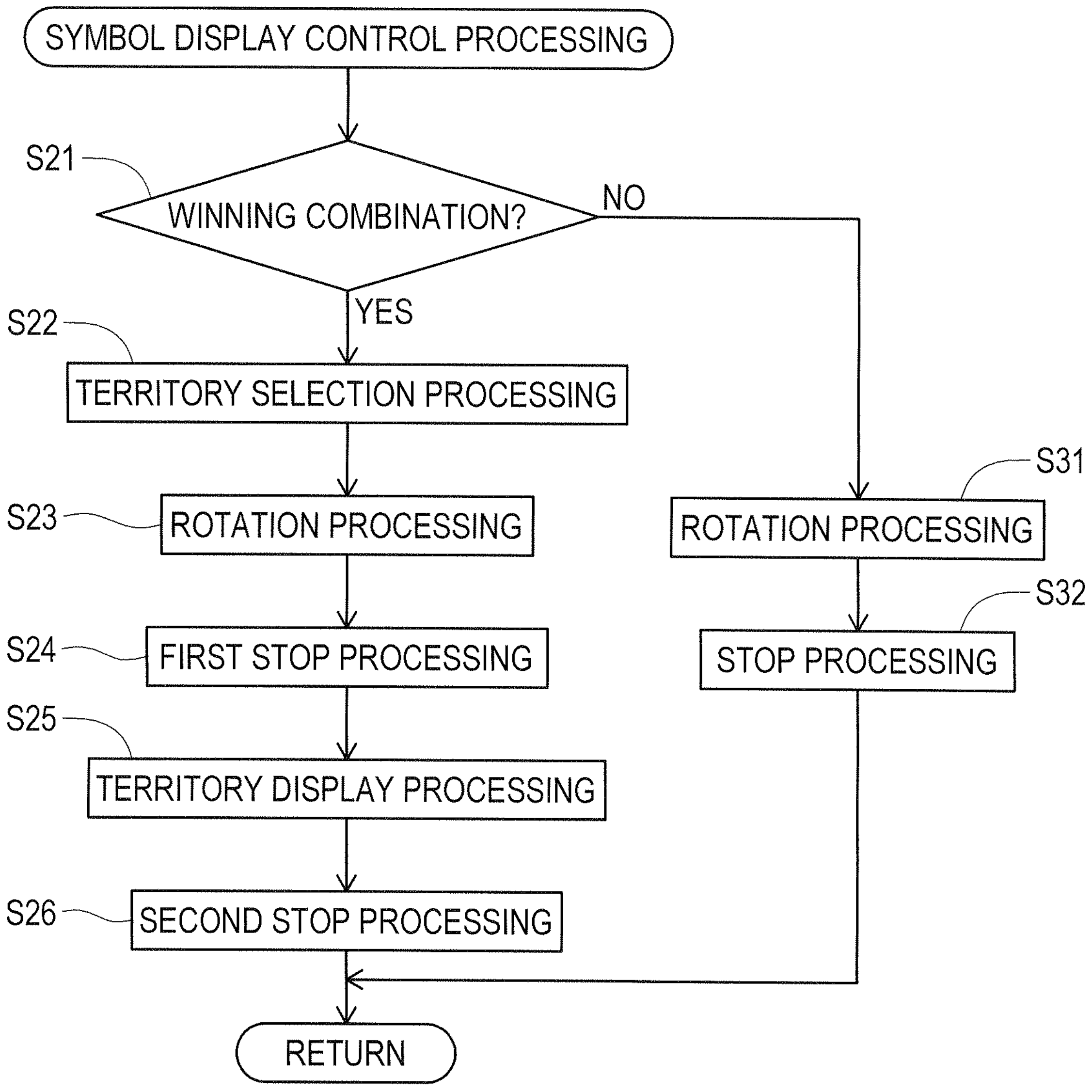
FIG. 29 is a flowchart of a symbol display control processing program.

After the main CPU 32 conducted the base game lottery processing of S13 in FIG. 28 described above, the processing is shifted to S21 shown in FIG. 29.

In S21, the main CPU 32 determines whether or not a winning combination is realized. Based on the respective code numbers, that are being stored in the RAM 33, of the video reels R1, R2 and R3, this determination is made. At this point, if a winning combination is not realized (S21: NO), the processing shifts to S31.

In S31, the main CPU 32 conducts a rotation processing. In other words, by sending a control signal to the sub control board 72, the main CPU 32 starts a scrolling display of each video reel R1, R2 and R3. After that, an effect mode (a display mode of images on the liquid crystal panel 5B and a sound output mode from the speakers 23) for each unit game is determined by the main CPU 32, and the sub control board 72 is ordered to start the effect in a predetermined effect pattern. Thereafter, the processing is shifted to S32. In S32, when a predetermined timing to stop displaying each video reel R1, R2 and R3 in scrolling manner has come, a stop processing is conducted by the main CPU 32. In other words, by sending a control signal to the sub control board 72, the main CPU 32 stops the scrolling of each video reel R1, R2 and R3 based on the code number stored in the RAM 33. With this, a symbol combination which determined in S13 described above is rearranged on the pay line L of the liquid crystal panel 5B. Then, returning to the main game processing shown in FIG. 28 described above, the processing is shifted to S15.

In contrast, in S21 shown in FIG. 29, the processing is shifted to S22 if a winning combination is realized (S21: YES). In S22, the main CPU 32 conducts a territory selection processing. In this processing, the main CPU 32 extracts one random number from the random numbers ranging from “0” to “255”. Further, the main CPU 32 specifies a probability table corresponding to the winning combination which is a target of the determination in S21 described above from among the probability tables shown in FIGS. 14-25. Then, the main CPU 32 refers to the specified probability table and selects a territory parameter corresponding to a value of the extracted random number. Then, the processing is shifted to S23.

In S23, the main CPU 32 conducts a rotation processing. Concretely, the main CPU 32 sends a control signal to the sub control board 72 to thereby start a rotation display of the video reels R1, R2 and R3. Thereafter, the main CPU 32 determines an effect mode (a display mode of images on the liquid crystal panel 5B and a sound output mode from the speakers 23) and sends a control signal to the sub control board 72, and thereby starts an effect in the determined effect pattern. Then, the processing is shifted to S24.

In S24, when a predetermined timing to stop the rotation display of each video reel R1 and R2 has come, the main CPU 32 conducts a first stop processing. Concretely, if the main CPU 32 sends a control signal to the sub control board 72, each video reels R1 and R2 is sequentially-stopped and displayed based on the code numbers stored in the RAM 33, as shown in the liquid crystal panels 5B of the first stage and the second stage of FIG. 1 described above, for instance. Then, the processing is shifted to S25.

In S25, the main CPU 32 conducts a territory display processing. In this processing, the main CPU 32 sends a control signal to the sub control board 72 to display distinctly by color a territory corresponding to the player on the screen H3 of the liquid crystal panel 5B. This control signal is configured to include the value of the switch parameter set in S11 of FIG. 28 described above and the territory parameter selected in S22 described above. Meanwhile, in the sub control board 72, the sub CPU 74 specifies either one of the table of FIG. 13 or the table of FIG. 30, based on the switch parameter included in this control signal. Further, the sub CPU 74 refers to the specified table and displays an image corresponding to the territory parameter included in this control signal on the screen H3 of the liquid crystal panel 5B. In this manner, there is displayed the map of Japan or the map of America, in which the territory corresponding to the player is distinguished by color, on the screen H3 of the liquid crystal panel 5B. Then, the processing is shifted to S26.

Incidentally, in the liquid crystal panel 5B shown in the third stage of FIG. 1 described above, the map of Japan is displayed, in which two-thirds of Japanese territory shows the size of the territory corresponding to the player. In this case, the control signal sent to the sub control board 72 includes the territory parameter of “2” and the switch parameter of “1”.

In S26, when a predetermined timing to stop the rotation display of the video reel R3 has come, the main CPU 32 conducts a second stop processing. Specifically, if the main CPU 32 sends a control signal to the sub control board 72, the video reel R3 is stopped and displayed based on the code number stored in the RAM 33, as shown in the liquid crystal panel 5B of the fourth stage of FIG. 1 described above, for instance. Accordingly, the symbol combination determined in S13 described above is rearranged on the pay line L of the liquid crystal panel 5B. Then, returning to the main game processing shown in FIG. 28 described above, the processing is shifted to S15.

Then, the main CPU 32 shifts to S15, at which it determines whether or not there is a winning combination. Based on the code numbers of the respective video reels R1, R2 and R3 that were stored in the RAM 33, this determination is made. At this point, if there is not a winning combination (S15: NO), the main CPU 32 re-conducts the main game processing shown in this FIG. 28. In contrast, if there is a winning combination (S15: YES), the processing is shifted to S16.

Incidentally, the main CPU 32 conducts a payout amount display processing in S15. More specifically, first, the main CPU 32 computes an amount obtained by multiplying the payout amount in accordance with the winning combination rearranged on the pay line L of the liquid crystal panel 5B, by the bet amount. This computation is made based on the bet information stored in the RAM 33 and the payout table in FIG. 6, the computed amount is stored in the RAM 33 as payout information. Then, the main CPU 32 displays the payout information (computed amount) stored in the RAM 33 on the payout amount display portion 9 in the liquid crystal panel 5B, by sending a control signal to the sub control board 72.

In S16, the main CPU 32 determines whether or not a bonus game trigger is realized. More specifically, if three symbols “FRANKENSTEIN” are rearranged on the pay line L of the liquid crystal panel 5B, it is determined that the bonus game trigger is realized. Incidentally, this determination as well is made based on the code numbers of the respective video reels R1, R2 and R3 stored in the RAM 33. At this point, if the bonus game trigger is realized (S16: YES), the main CPU 32 conducts a bonus game processing in S17. Incidentally, in the bonus game processing, a free game is conducted wherein a predetermined number of a slot game are automatically repeated. A detailed description of the free game is hereby omitted.

After that, the main CPU 32 conducts a payout processing in S18, including the case when the bonus game trigger is not realized (S16: NO). In the payout processing, the payout amount obtained by the player in a slot game and a bonus game (a free game), is awarded to the player, based on the payout information stored in the RAM 33. When the payout is conducted, a credit amount which is stored in the RAM 33 as the payout information (the payout amount obtained by the player in a slot game and a bonus game (a free game) respectively) is added to a credit amount stored in the RAM 33 as credit information by the main CPU 32, and the added value is overwritten in the RAM 33 as the credit information by the main CPU 32. And then, a control signal is sent to the sub control board 72 by the main CPU 32, the credit information stored in the RAM 33 (the added value in this S18) is displayed on the credit amount display portion 8 in the liquid crystal panel 5B. At the same time, "0" is overwritten to the RAM 33 as the payout information by the main CPU 32, and by sending a control signals to the sub control board 72, on the payout amount display portion 9 in the liquid crystal panel 5B, "0" is displayed.

Incidentally, in the payout processing, the credit amount owned by the player at the moment may be paid out by coins corresponding to the credit amount (one credit equals to one coin) based on the player's depressing the CASHOUT button from the operation buttons 11, or may also be paid out by a ticket with a bar code which is printed by the ticket printer 14. After the payout processing in S18 described above is conducted, the main CPU 32 re-conducts the main game processing shown in this FIG. 28.

[9. Other]

The present disclosure is not limited to the embodiments described above, but various modifications can be made thereto without departing from the spirit of the present disclosure.

For instance, a territory corresponding to a player may be displayed on the screen H3 of the liquid crystal panel 5B in other manner such as blinking display.

Also, a territory corresponding to a player may be displayed on the liquid crystal panel 5A, or a special display device other than the liquid crystal panels 5A, 5B. The special display device may be a liquid crystal panel. Otherwise the special display device may be a device which illuminates with backlighting a plastic panel on which the map of Japan or the map of America is printed.

Further, even if a winning combination is not realized (S21: NO), each processing of the above S22-S26 may be conducted. In this case, a probability table specified in S22 described above may be specified at random from among the probability tables shown in FIGS. 14-25, otherwise may be provided separately from them.

What is claimed is:

1. A gaming machine, comprising:

a processor;

a cabinet;

a display installed at a front face of the cabinet, controlled by the processor, and divided into two or more screens;

a symbol arranging device controlled by the processor and displayed in one of the two or more screens of the display;

an territory displaying device for indicating any one of a plurality of territories by displaying an image of a territory in another one of the two or more screens of the display;

a game start button which triggers the processor to execute a control of arranging a plurality of symbols on the symbol arranging device and determining the image of the territory to be displayed by the territory displaying device;

a memory device which stores a plurality of probability tables that the processor uses for selecting through a random number the image of the territory to be displayed by the territory displaying device from among a plurality of images that each show a territory corresponding to a player in a country, wherein the plurality of images include an image showing a large territory indicating a large portion of a map of a country corresponding to the player, and an image showing a small territory that is smaller than the large territory and indicating a small portion of the map of the country;

wherein the probability tables are provided for a plurality of game results that the processor randomly determines based on a state of arrangement of the plurality of symbols arranged on the symbol arranging device, wherein the probability tables include a first probability table corresponding to a case that a gaming value to be awarded based on a determined game result to the player is larger than a first gaming value, and a second probability table corresponding to a case that a gaming value to be awarded based on the determined game result to the player is smaller than a second gaming value that is equal to or smaller than the first gaming value;

wherein the processor determines any one of the probability tables based on the determined game result, and selects the image to be displayed by the territory displaying device from among the plurality of images by using the random number and the probability table determined by the determined game result, wherein the processor causes the image, that is selected from among the plurality of images, to be displayed by the territory displaying device before displaying a combination of symbols corresponding to the determined game result on the symbol arranging device, wherein a probability with which the image showing the large territory is selected by the processor is higher than a probability with which the image showing the small territory is selected by the processor in the first probability table, and wherein a probability with which the image showing the small territory is selected by the processor is higher than a probability with which the image showing the large territory is selected by the processor in the second probability table.

* * * * *